| (12) | United States Patent | (10) Patent No.: | US 12,298,176 B2 |
|---|---|---|---|
| | Sidiropoulos | (45) Date of Patent: | May 13, 2025 |

(54) AIRPORT SOUND AND NOISE MANAGEMENT METHODS AND SYSTEMS

(71) Applicant: Vianair Inc., Wilmington, DE (US)

(72) Inventor: Stavros Sidiropoulos, New York, NY (US)

(73) Assignee: Vianair Inc., Wilmington, DE (US)

( * ) Notice: Subject to any disclaimer, the term of this patent is extended or adjusted under 35 U.S.C. 154(b) by 258 days.

(21) Appl. No.: 18/154,479

(22) Filed: Jan. 13, 2023

(65) Prior Publication Data

US 2023/0221173 A1 Jul. 13, 2023

Related U.S. Application Data

(60) Provisional application No. 63/299,140, filed on Jan. 13, 2022.

(51) Int. Cl.
  *H04R 29/00* (2006.01)
  *G01H 17/00* (2006.01)
  *G08G 5/00* (2006.01)
  *G06Q 50/26* (2012.01)

(52) U.S. Cl.
  CPC ........... *G01H 17/00* (2013.01); *G08G 5/0095* (2013.01); *H04R 29/008* (2013.01); *G06Q 50/26* (2013.01)

(58) Field of Classification Search
  CPC ...... H04R 29/008; H04R 29/004; G10L 25/51
  USPC .......................................................... 381/56
  See application file for complete search history.

(56) References Cited

U.S. PATENT DOCUMENTS

| 10,330,648 | B2 * | 6/2019 | Nicq | G01M 15/12 |
|---|---|---|---|---|
| 10,445,847 | B2 * | 10/2019 | McCann | G08G 5/0095 |
| 10,896,687 | B2 * | 1/2021 | Guerrieri | G10L 25/51 |
| 11,189,177 | B2 | 11/2021 | Sidiropoulos | |
| 11,843,927 | B2 * | 12/2023 | Miyanaka | H04R 29/008 |
| 12,050,154 | B2 * | 7/2024 | Locheron | G01M 3/24 |

* cited by examiner

*Primary Examiner* — Disler Paul

(74) *Attorney, Agent, or Firm* — Perkins Coie LLP

(57) ABSTRACT

Methods and systems for airport noise management, which are based on integrating virtual noise monitoring with actual noise recordings via mobile application system, are disclosed. An example method of improving airport noise management includes receiving information associated with a flight segment, generating a virtual noise map for the flight segment that includes a virtual noise metric generated for each of a multiple user-defined locations that span a projection of the flight path on the Earth. The method includes receiving, from a mobile application at a user location, an audio recording that was recorded in a recording interval, generating, based on the virtual noise map for the flight segment, a virtual noise metric associated with the user location, and determining a validity of the audio recording by comparing the virtual noise metric associated with the user location to a recorded noise metric that is calculated based on the audio recording.

22 Claims, 9 Drawing Sheets

| Noise Family | Metric Type | Noise Metric | Weighting Factors | | | Averaging Time (hr) | Time-Averaging Constant ($N_T$) |
|---|---|---|---|---|---|---|---|
| | | | Day ($W_{day}$) | Evening ($W_{eve}$) | Night ($W_{ngt}$) | | |
| A-Weighted | Exposure Based | SEL | 1 | 1 | 1 | - | 1 |
| | | DNL | 1 | 1 | 10 | 24 | 86,400 |
| | | CNEL | 1 | $3^{xxi}$ | 10 | 24 | 86,400 |
| | | LAEQ | 1 | 1 | 1 | 24 | 86,400 |
| | | LAEQD | 1 | 1 | 0 | 15 | 54,000 |
| | | LAEQN | 0 | 0 | 1 | 9 | 32,400 |
| | | User-defined | A | B | C | T | T*3,600 |
| | Maximum Level | NANL | 1 | 1 | 1 | - | 1 |
| | | LAMAX | 1 | 1 | 1 | - | - |
| | | User-defined | A | B | C | - | - |
| | Time-Based | NANL | 1 | 1 | 1 | - | - |
| | | TALA | 1 | 1 | 1 | - | - |
| | | TAUD | 1 | 1 | 1 | - | - |
| | | TAUDSC | 1 | 1 | 1 | - | - |
| | | TAUDP | 1 | 1 | 1 | - | - |
| | | TAUDPSC | 1 | 1 | 1 | - | - |
| | | User-defined | A | B | C | - | - |
| C-Weighted | Exposure Based | CDNL | 1 | 1 | 1 | 24 | 8,6400 |
| | | CEXP | 1 | 1 | 1 | - | - |
| | | User-defined | A | B | C | T | T*3,600 |
| | Maximum Level | NANL | 1 | 1 | 1 | - | - |
| | | LCMAX | 1 | 1 | 1 | - | - |
| | | User-defined | A | B | C | - | - |
| | Time-Based | NANL | 1 | 1 | 1 | - | - |
| | | TALC | 1 | 1 | 1 | - | - |
| | | User-defined | A | B | C | - | - |
| Tone-Corrected Perceived | Exposure Based | EPNL | 1 | 1 | 1 | - | 1 |
| | | NEF | 1 | 1 | 16.7 | 24 | $630{,}957{,}345^{xxii}$ |
| | | WECPNL | 1 | $3^{xxiii}$ | 10 | 24 | $8{,}640^{xxiv}$ |
| | | User-defined | A | B | C | T | T*3,600 |
| | | PNLTM | 1 | 1 | 1 | - | - |

FIG. 3

AIRPORT SOUND AND NOISE MANAGEMENT METHODS AND SYSTEMS

CROSS-REFERENCE TO RELATED APPLICATION

This application claims priority to U.S. Provisional Application 63/299,140 filed on Jan. 13, 2022, the disclosure of which is hereby incorporated by reference herein in its entirety.

TECHNICAL FIELD

This patent document is directed generally to airspace and airport systems, and more particularly, to airport and urban environment sound and noise management of aircraft operations.

BACKGROUND

Aircraft operations, including all aircraft types included but not limited to commercial aircraft, general aviation, helicopters, air taxis, drones, etc., produce noise that is harmful and the cause of annoyance to residential areas. With the increase of traditional aircraft operations (commercial, general aviation, helicopter, etc.) both in urban and suburban environments and the introduction of new aircraft types such as air taxis and drones, communities have experienced increased aircraft noise levels leading to a deterioration of quality of life and potential health problems. As a result, cities and airport management authorities have requested more efficient airport operations noise and sound management.

SUMMARY

Disclosed are devices and methods for airport noise management (ANM), which advantageously provides efficient airport and urban environments sound and noise management based on integrating virtual noise monitoring with actual noise recordings via mobile application system. ANM equips airports and cities with a system to track and manage aircraft operations sound and noise impact to local communities more efficiently.

In an example aspect, the disclosed technology includes a method for estimating noise impact that includes a virtual noise monitoring system that uses real-time and historic recorded flight track data and a theoretical noise model to estimate real-time and historic noise impact from aircraft operations.

In another example aspect, the disclosed technology includes a mobile phone application or physical noise monitor that collects actual noise recording data, location data and time stamps, via a mobile phone application or physical monitor application, which is configured to send the data to a central server.

In yet another example aspect, the disclosed technology includes a centralized software platform that combines virtual noise estimates with actual recordings and estimates both virtual and actual noise impact for both real-time and historic operations and produces graphical and textual reports on noise levels for any location where flight tracking or actual noise recordings are available.

In yet another example aspect, the disclosed technology includes a system for noise complaint tracking and management.

In yet another example aspect, the disclosed technology includes a mobile phone application that communicates the graphical and textual reports to the users of the application.

In yet another example aspect, the disclosed technology streamlines the noise filing complaint process and gives the airport credible complaints and the user an informed assessment of their situation.

In yet another example aspect, the disclosed technology includes a method of improving airport sound and noise management that includes receiving information associated with a flight segment, the information comprising (a) a flight path between a starting location of the flight segment and an ending location of the flight segment and (b) a starting time of the flight segment and an ending time of the flight segment, generating a virtual noise map for the flight segment, wherein the virtual noise map comprises a virtual noise metric generated for each corresponding user-defined location of a plurality of user-defined locations that spans a projection of the flight path on a surface of the Earth, receiving, from a mobile application at a user location, an audio recording that was recorded in a recording interval, wherein the user location is within a predetermined distance of the projection of the flight path, and wherein the starting time of the flight segment precedes a start time of the recording interval, generating, based on the virtual noise map for the flight segment, a virtual noise metric associated with the user location, and determining a validity of the audio recording by comparing the virtual noise metric associated with the user location to a recorded noise metric that is calculated based on the audio recording.

In yet another example aspect, the disclosed technology includes a system for improving airport sound and noise management that includes a processor, and a memory coupled to the processor, wherein the memory includes instructions, when executed by the processor, cause the processor to receive information associated with a flight segment, the information comprising (a) a flight path between a starting location of the flight segment and an ending location of the flight segment and (b) a starting time of the flight segment and an ending time of the flight segment, generate, based on noise recordings from a plurality of recording devices, a noise map for the flight segment, wherein each of the plurality of recording devices is located at a corresponding recording location of a plurality of recording locations that spans a projection of the flight path on a surface of the Earth, receive, from a mobile application at a user location, an audio recording that was recorded in a recording interval, wherein the user location is within a predetermined distance of the projection of the flight path, and wherein the starting time of the flight segment precedes a start time of the recording interval, generate, based on the noise map the flight segment, a virtual noise metric associated with the user location, and determine a validity of the audio recording by comparing the virtual noise metric to a recorded noise metric that is calculated based on the audio recording.

In yet another example aspect, the disclosed technology includes a system for improving airport sound and noise management that includes a flight track feed to provide information associated with a flight segment, the information comprising a flight path between a starting location of the flight segment and an ending location of the flight segment, a hybrid virtual noise monitoring system to receive the information from the flight track feed, generate, based on the information, a virtual noise metric for each corresponding user-defined location of a plurality of user-defined locations, wherein the plurality of user-defined locations is associated with the hybrid virtual noise monitoring system and spans a projection of the flight path on a surface of the Earth, generate, based on the virtual noise metrics for the plurality of user-defined locations, a virtual noise map for the flight segment, determine, for each of the plurality of user-defined locations, whether the corresponding virtual noise metric is less than a threshold noise level associated with regulatory noise compliance for the corresponding user-defined location, and generate, based on the virtual noise map and the determining, at least one visualization showing the regulatory noise compliance, and a visualization interface to receive the at least one noise visualization and provide for display at least a first portion of the at least one noise visualization.

In yet another example aspect, the above-described methods are embodied in the form of processor-executable code and stored in a computer-readable program medium.

In yet another example aspect, a device that is configured or operable to perform the above-described methods is disclosed.

The above and other aspects and features of the disclosed technology are described in more detail in the drawings, the description and the claims.

BRIEF DESCRIPTION OF DRAWINGS

FIG. 3 illustrates an example of the Document 29 Noise Metrics.

DETAILED DESCRIPTION

Aircraft noise is the most significant cause of adverse community reaction related to the operation and expansion of airports. This is expected to remain the case in most regions of the world for the foreseeable future. Limiting or reducing the number of people affected by significant aircraft noise is therefore one of the main priorities of airport authorities.

Embodiments of the disclosed airport noise management (ANM) system provide, amongst other features, the following benefits:
1. Noise event evaluation at any location and at any moment within an area of interest using virtual noise monitors;
2. Combined virtual and actual noise event evaluation at any location and at any moment within an area of interest using virtual noise monitors and noise recordings provided by residents via the mobile application (e.g., using their phone or a physical noise monitor to record aircraft noise);
3. Understanding of noise event impact by residents because:
    a. they are involved in the recording process, and
    b. they receive periodic reports with noise event information;
4. Enable airports and authorities to evaluate individual noise complaints for their validity by having the capability to review individual noise recordings and compare them to virtual noise estimation;
5. A holistic system for the management of noise complaints;
6. A holistic system for airport noise management;
7. A way for residents to easily file noise complaints and monitor in real-time the status of their filed complaint in terms of when it has been processed; and
8. Residents to monitor the implementation of new flight procedures and their effectiveness in more equitably managing noise impact via the app reporting.

Section headings are used in the present document to improve readability of the description and do not in any way limit the discussion or the embodiments (and/or implementations) to the respective sections only.

1 Components of an Example Airport Noise Management (ANM) System

Figure 1:
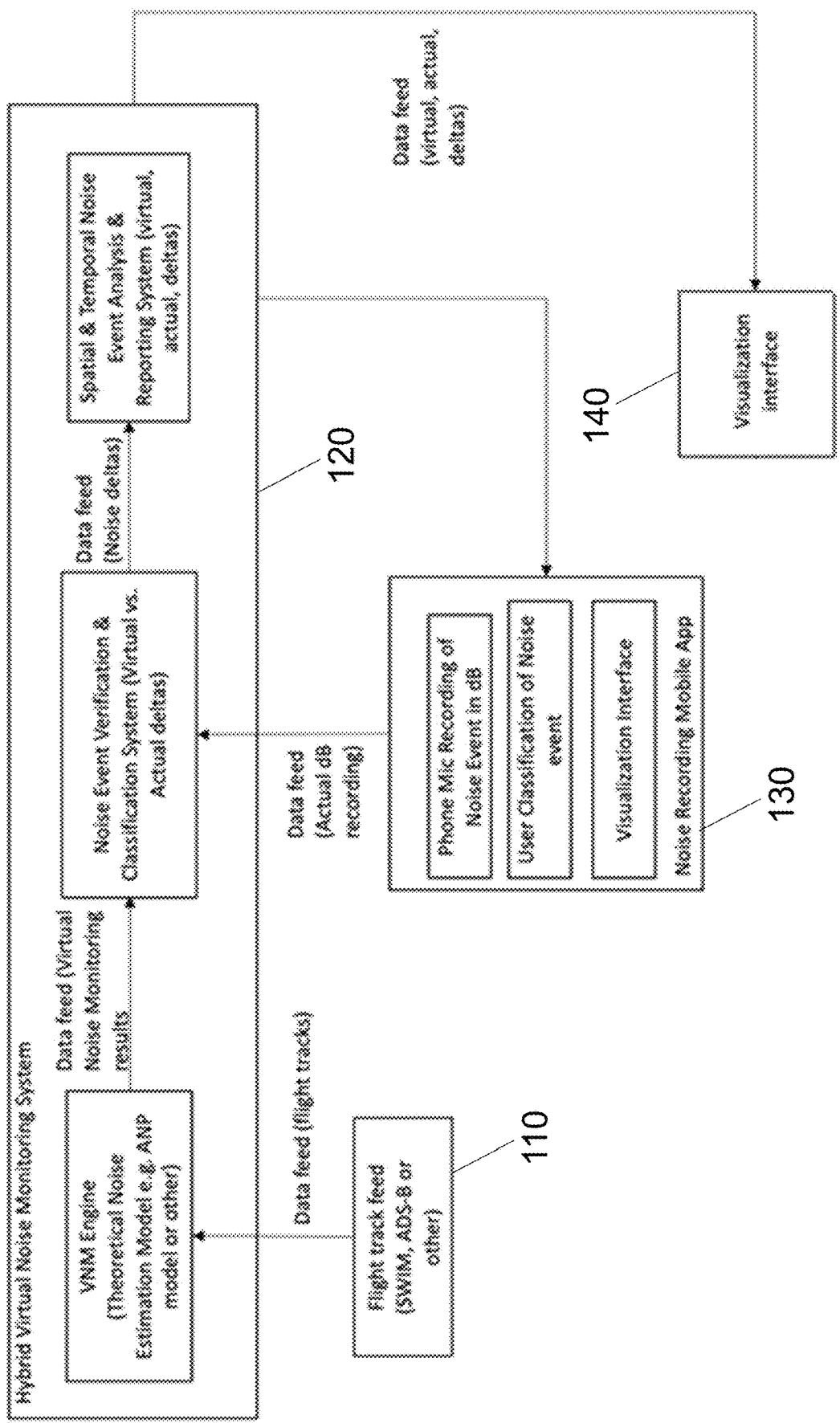
FIG. 1 illustrates an example of a noise map for an airport that is generated using embodiments of the disclosed technology.

In some embodiments, the components of an example ANM system, illustrated in FIG. 1, include a flight track feed 110, a hybrid virtual noise monitoring system 120, a noise recording mobile application 130, and a visualization interface 140.

1.1 Flight Track Feed

In some embodiments, the flight track feed 110 is enabled by a radar system for the capturing of flight track data. Such systems may include, but are not limited to, the System Wide Information Management (SWIM) operated by the Federal Aviation Administration (FAA), individual Automatic Dependent Surveillance-Broadcast (ADS-B) receivers, and the like. The flight track feed 110 transmits aircraft information and location data to the hybrid virtual noise monitoring system 120.

In an example, the ADS-B transponder on the aircraft transmits a signal containing the location (amongst other information), which is picked up by an ADS-B receiver that is connected to the flight track feed 110. Currently, the United States has required many aircraft (including all commercial passenger carriers and aircraft flying in areas that required a transponder) to be equipped with an ADS-B transponder since January 2020, and the equipment has been mandatory for some aircraft in Europe since 2017, which enables embodiments of the disclosed technology to provide up-to-date information for nearly all airports in the United States and Europe.

In another example, the position of an aircraft that is not equipped with an ADS-B transponder, but which is traveling in a region with coverage from other receivers, is determined using multilateration (using a method known as Time Difference of Arrival (TDOA)). When four or more receivers receive signals from an older transponder (e.g., a ModeS-transponder) on an aircraft, multilateration can be used to determine the location of the aircraft, which is reported to the flight track feed 110. In yet another example, satellite-based flight tracking is used to determine the location of an aircraft, which is then reported to the flight track feed 110.

1.2 Hybrid Virtual Noise Monitoring System

In some embodiments, and as illustrated in FIG. 1, the hybrid virtual noise monitoring system 120 includes (i) a virtual noise monitoring (VNM) engine, (ii) a noise event verification and classification system, and (iii) a spatial and temporal noise event analysis system and reporting system.

Virtual noise monitoring (VNM) engine. In some embodiments, the VNM engine receives aircraft data from the flight track feed 110 and records the aircraft data. The aircraft data is processed by a theoretical model that calculates noise event data from the flight tracks for a variety of noise metrics.

Noise calculations are based on exposure-based noise level metrics. In an example, this is implemented by creating a grid of noise receptor locations along the path of the flight path, and is first evaluated for noise. For each flight path, exposure-based noise level metrics due to aircraft (e.g., fixed-wing aircraft, helicopter, unmanned airspace systems, drone, air taxi, and the like) operations from each flight path segment are computed. The total noise exposure is then calculated at each receptor location by combining all the individual flight path segment noise contributions at that location.

In some embodiments, and for the calculation of the exposure-based noise level metrics for each flight, Eurocontrol's Aircraft Noise Performance (ANP) according to Document 29 methodology may be applied. In other embodiments, more sophisticated noise calculation methods that provide more accurate metrics may be used.

The calculations assume each flight has an associated number of operations for day, evening and night-time periods. Furthermore, depending on each metric, each time period may have a weighting factor, i.e., a noise penalty. To compute the weighted sound exposure ration $E_{wt,seg}$, the number of operations associated with each time period and for given weighting factors is calculated using the following equation:

$$E_{wt,seg} = [W_{day} \cdot N_{day} + W_{eve} \cdot N_{eve} + W_{ngt} \cdot N_{ngt}] \cdot E_{seg}$$

where $N_{day}$ is the number of user-specified operations between 07:00 and 19:00 hours local time;

$N_{ngt}$ is the number of user-specified operations between 22:00 and 07:00 hours local time;

$W_{day}$ is the day-time weighting factor, either standard or user-defined;

$W_{eve}$ is the evening weighting factor, either standard or defined;

$E_{ngt}$ is the night-time weighting factor, either standard or user-defined; and $E_{seg}$ is the sound exposure ratio at a receptor location due to a single flight path segment of a flight operation.

The weighted sound exposure ratio is computed iteratively for each segment $E_{wt,seg(i)}$ and the sum of all segments of the flight path result in the weighted sound exposure ratio for an entire flight operation, using the following equation:

$$E_{wt,flt} = \sum_{i=1}^{n_{seg}} E_{wt,seg(i)}$$

where $n_{seg}$ is the number of segments in the three-dimensional flight path; and $E_{wt,seg(i)}$ is the weighted sound exposure ratio for operation on the $i_{th}$ segment of a flight path.

Once the maximum noise level for each flight path segment is calculated, the maximum noise level at a receptor location can be computed by performing a pairwise comparison between all flight-segments at each receptor location and preserving the largest value, e.g., using:

$$L_{Smx,flt} = \max_{i=1 \ldots n_{seg}} [L_{Smx,seg(i)}]$$

where $n_{seg}$ is the number of segments in the three-dimensional flight path.

Note on Noise Scales and Levels, Metrics, and Indices

Two particular scales are important for aircraft noise: the A-weighted sound level and the tone-corrected perceived noise level.

The A-weighting is a simple filter applied to sound measurements, which applies more or less emphasis to different frequencies to mirror the frequency sensitivity of the human ear at moderate sound energy levels. The A-weighted sound level is an almost universally used scale of environmental noise levels and is used for most aircraft monitoring applications, typically denoted as $L_A$.

Figure 2:
FIG. 2 illustrates a block diagram of an airport noise management (ANM) system, according to embodiments of the disclosed technology.

The noise impact assessments needed to generate noise exposure contours (e.g., as shown in FIG. 2) generally rely in A-weighted metrics.

There are two main types of noise metrics: single noise event metrics and total noise experienced over longer time periods (cumulative noise metrics). Noise levels (specific dB values) are usually defined at fixed observer locations or mapped as contours (isolines) depicting the area where the specified levels are exceeded.

Single event noise metrics are used to describe the acoustic event caused by a single aircraft movement. Two types are typically used: (1) The $L_{A,max}$ based on the maximum sound intensity during the event and (2) $L_E$, based on the total sound energy in the event. The total sound energy can be expressed as the product of the maximum sound intensity and an affective duration of the event.

Three corresponding single event metrics of particular importance in aircraft noise include, but are not limited to:

(1) Maximum A-weighted Sound level ($L_{A,max}$)
(2) Sound exposure level (SEL or $L_{AE}$)
(3) Effective perceived noise level ($L_{EPN}$)

Two of these, $L_{AE}$ and $L_{A,max}$ can be measured directly with a standard precision sound level meter. Theoretically, $L_{AE}$ is generally preferred, as it accounts for the duration of the event as well as its intensity. However, for aircraft noise, $L_{AE}$ measurements are more susceptible to interference from background noise and many non-specialists find the $L_{AE}$ concept difficult to grasp, because for the same event, $L_{AE}$ typically exceeds $L_{A,max}$ by approximately 10 dB. Thus, $L_{A,max}$ is the favored metric for day-to-day noise monitoring at airports.

Lastly, cumulative noise metrics, such as the day-night level (DNL) which is weighted to account for annoyance during specific periods of day (typically day, evening and night) are also biased by assumptions about aircraft traffic mix, frequency and distribution during its period. When comparing route alternatives, it is preferred to use the $L_{A,max}$ metric as it allows for a direct and unbiased comparison between route design alternatives.

Thus, for the above reasons, $L_{A,max}$ is typically selected.

The weight factors for different types are given in the following table. It is noted that in this case the A-weighted $L_{A,max}$ metric was used. The weighting factors for the A-weighted $L_{A,max}$ are equal to 1 for each period. The weighting factors for Document 29 Noise Metrics are shown in FIG. 3.

In some embodiments, the VNM engine can be used for real-time and historic playback. For example, the $L_{A,max}$ noise level can be calculated for each monitor at a given timestamp. This noise level is calculated as the maximum among the $L_{A,max}$ noise levels produced by each of the active flights at the given timestamp. The $L_{A,max}$ noise level of each flight is calculated as the noise produced by the appropriate segment of the flight for the specified timestamp. The appropriate segment of the flight is calculated taking into consideration the timestamps at each flight point and the time the aircraft noise would need to travel from each flight point to the specified monitor (this time depends on the distance from the monitor to the flight points). As a result, for each timestamp, the appropriate segment of a flight corresponds to the segment occurring a few seconds before the selected timestamp.

Noise Event Verification and Classification System

In some embodiments, the noise event verification and classification system (NEVCS) receives (i) virtual noise monitoring data from the VNM Engine and (ii) actual noise recordings from the noise recording mobile application 130. It then matches the actual noise recording data, including noise recording, location and timestamps, to the closest aircraft identified by the flight tracking system. The VNM Engine calculates the noise using the abovementioned virtual method and the flight track feed. The NEVCS then analyzes and combines the actual noise recordings with the VNM Engine results data to produce noise deltas between actual and virtual results. The noise deltas can be used to further produce one or more of the following:

hybrid noise results: the virtual results are adjusted by the delta
   statistical analysis on the significance of the deltas
   verification of actual recordings for errors In some embodiments, the results can then be classified into categories such as, verified results (e.g., delta<3 dB), unverified results (e.g., delta≥3 dB), or any number of other user specific categories. The NEVCS also contains the actual noise recordings that can be accesses by an airport noise expert for verification purposes (e.g., to ensure that the recording was of purely aircraft noise and not affected by road traffic, etc.).

Spatial and Temporal Noise Event Analysis and Reporting System

In some embodiments, the spatial and temporal noise event analysis and reporting system (STNEARS) analyzes noise events in spatial and temporal dimensions to produce graphical and textual outputs. Such outputs may include but are not limited to:

noise contour maps
   noise monitor grids
   noise monitor grid with noise delta comparisons
   noise exposure over time plots
   data tables In some embodiments, the noise deltas refer to the differences between actual and virtual (or simulated) results. In other embodiments, the noise deltas refer to the type of result over different periods of time, e.g., virtual results on day 1 vs. virtual results on day 2, or actual results over the first 12 hours of a day vs. actual results over the second 12 hours of the day.

1.3 Noise Recording Mobile Application

In some embodiments, and as illustrated in FIG. 1, the noise recording mobile application 130 includes (i) a noise event recording algorithm, (ii) a user interface for the classification on noise events, and (iii) a visualization interface.

Noise event recording algorithm. In some embodiments, the noise event recording algorithm is configured to use the phone microphone to record noise levels. In an example, the user taps a button to start a recording and taps again to finish the recording. In another example, the recording may be triggered by a noise above a predetermined threshold (e.g., in the range of 20-50 dB).

User interface for noise event classification. In some embodiments, the user can use an in-app interface to classify noise events. In an example, such classification may include categories such as "very annoying", "annoying", "nuisance", or "very loud", "loud", "okay", etc. In another example, the user can add notes to characterize and give context to each event, e.g., the environment (e.g., inside the car, in the living room, in the yard, etc.) around the user when they heard the noise event. In yet another example, the user can classify events as "better" or "worse" compared to a timeframe, e.g., pre-metroplex, etc.

Visualization interface. In some embodiments, the visualization interface on the noise recording mobile application 130 may be used to access visual and textual reports received from the hybrid virtual noise monitoring system 120 post analysis, e.g., any of the graphical or textual reports described above. In an example, the visualization interface is the screen of the smartphone that is hosting the mobile application. In another example, the visualization interface is a screen of another computing device that is communicatively coupled to the smartphone. In yet another example, the visualization interface is a webpage or local computer application.

1.4 Visualization Interface

In some embodiments, the visualization interface is configured to display the noise results and/or the graphical and textual reports generated by the hybrid virtual noise monitoring system 120. In an example, the visualization interface is designed using the airspace information modeling (AIM) concept principles, which are detailed in the following section. In this example, the noise results and analysis could be displayed in a 2D map control, 1D vertical control, a performance evaluation control, a 3D control, or a multiple dimension control that combines the above-mentioned or additional dimension analyses. Alternatively, the noise results may be accessed by users via a mobile phone application, a website, or a local computer application.

In some embodiments, the visualization interface is configured to display the noise results using a noise contour map for the airport, a noise monitor grid for the airport, a noise exposure over time plot for the airport, a noise exposure difference over time plot, or a data table associated with the airport.

2 An Example of the Airspace Information Model (AIM) Concept

Airspace information modeling (AIM) is a design method and associated system for efficient airspace design and planning, which enables parametric design and planning that can evaluate design criteria and requirements, while also evaluating performance and trade-offs of different metrics at design-time.

In some embodiments, AIM provides a five-dimensional (5D) process and system that enables the three-dimensional procedure design and evaluation (geometric characteristics of procedures) along with the evaluation of operational procedure and airspace system performance given the assignment of air traffic demand (time) to procedures and estimation of key performance indicators, such as fuel burn, flight time, distance travelled, emissions, noise and monetary cost of operations (cost).

2.1 Components of the Airspace Information Model (AIM)

Figure 4:
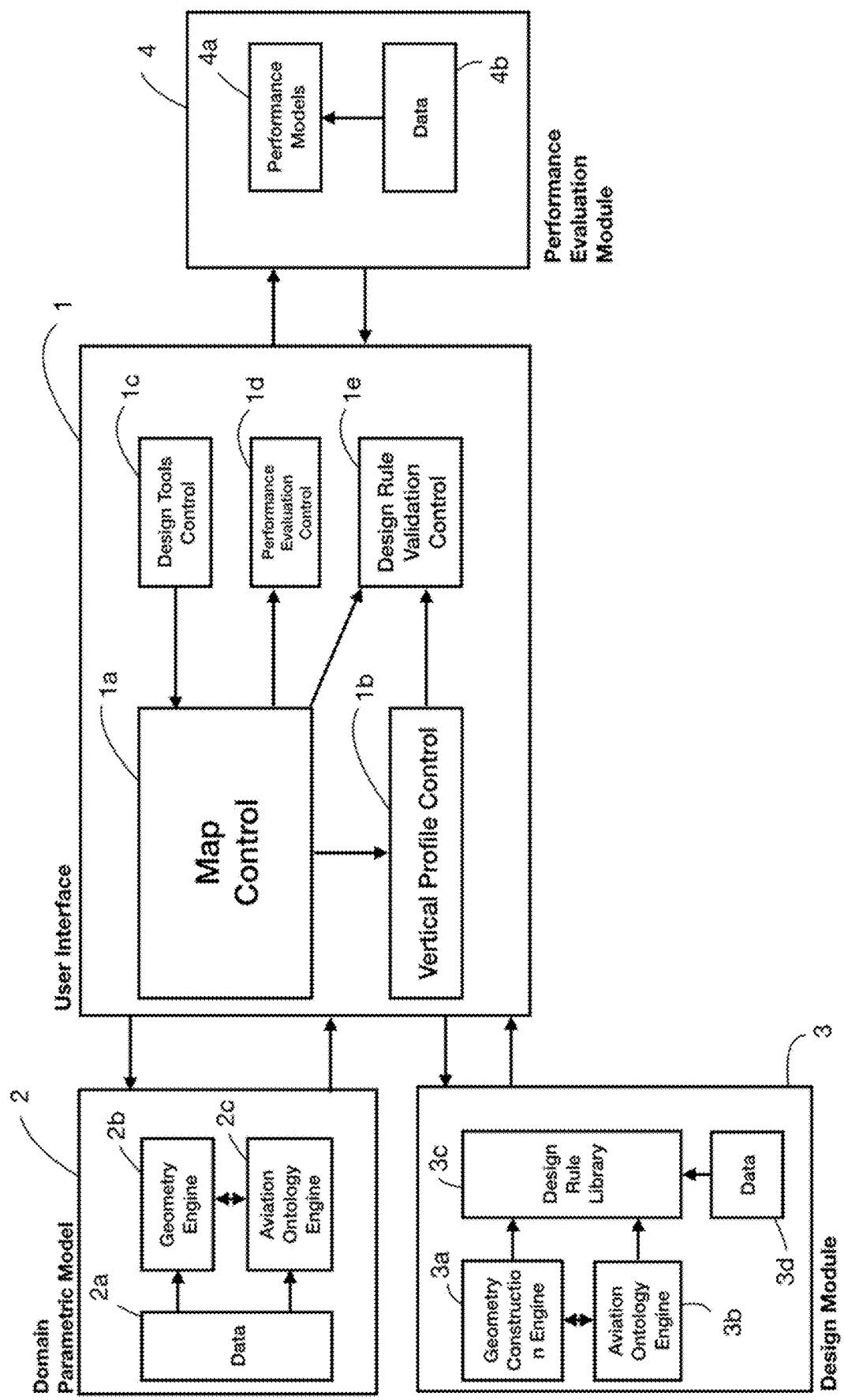
FIG. 4 is a block diagram illustrating an example of the Airspace Information Model (AIM) core architecture.

FIG. 4 illustrates some of the components and interactions of the AIM architecture. As illustrated therein, the AIM components include:

1. User interface (block 1 in FIG. 4)
2. Core parametric model (block 2 in FIG. 4)
3. Design module (block 3 in FIG. 4)
4. Performance evaluation module (block 4 in FIG. 4)

Figure 5:
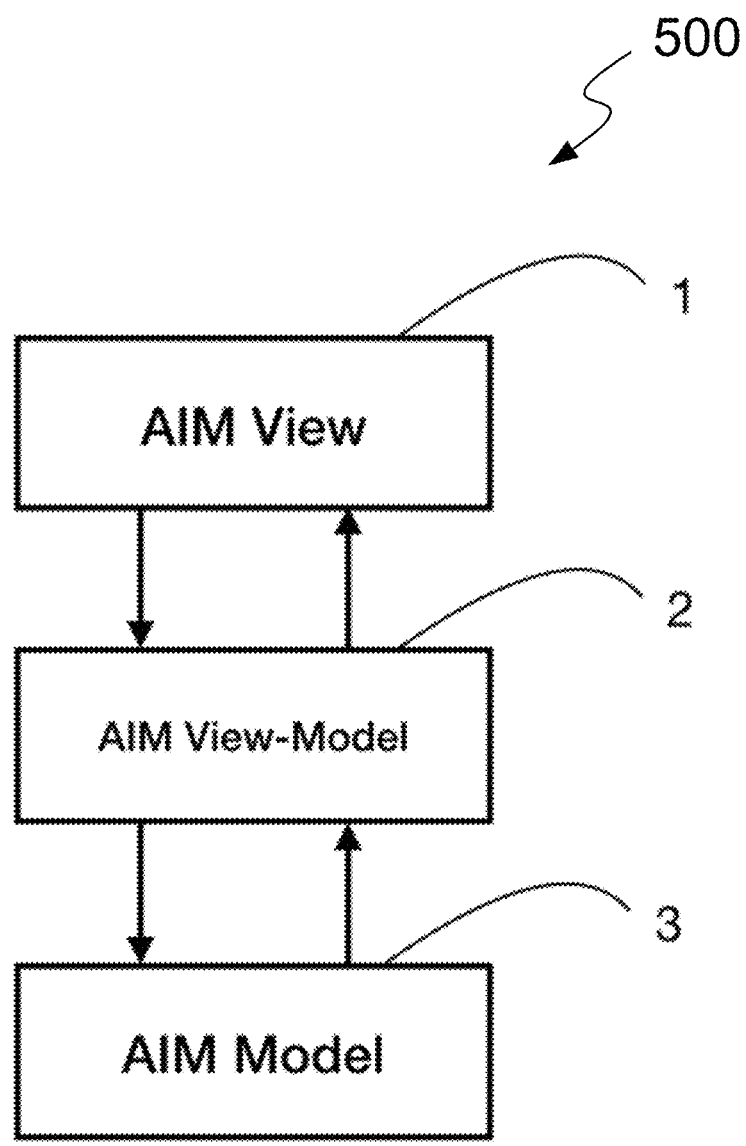
FIG. 5 is a block diagram illustrating the model-view-viewmodel (MVVM) architecture of the AIM engine.

In some embodiments, the AIM model is supported by an AIM engine. The AIM engine utilizes a Model-View-ViewModel (MVVM) architecture, as illustrated in FIG. 5, to enable the storing, distribution and display of data to the user. The MVVM architecture is a software architectural pattern that facilitates a separation of development of the graphical user interface from development of the business logic or back-end logic (the data model). The view model of MVVM is a value converter, which is responsible for exposing (converting) the data objects from the model in such a way that objects are easily managed and presented.

As illustrated in FIG. 5, the AIM engine consists of:
1. AIM view
2. AIM model
3. AIM view-model implementations In some embodiments, all functions of the user interface are supported by the AIM view. The core parametric model, design module and performance evaluation module are supported by the AIM model, and their interactions are mediated by the AIM view-model implementations, which act as use-case orchestrators between the user interface and the general capabilities of the AIM model.

2.2 Example Operation of AIM

In some embodiments, a user may perform different actions via a set of controls available via the user interface. For an example, such controls may include map control, vertical profile control, design tools control, performance evaluation control, design rules validation control, and other types of controls. Each control displays, at any given moment, the most up-to-date status and information regarding specific components of interest to the user via a relevant AIM view-model implementation. The user may use one or more of the controls to perform an action with regards to specific components of the system. Each user action is suitably translated through the relevant AIM view-model implementation to a number of requests, which are then forwarded to the relevant module or combination of modules (e.g., the core parametric model, the design module and the performance evaluation module) of the AIM model, in order to produce the relevant results, the outputs of which are interpreted and displayed in the user interface.

2.3 The AIM User Interface (UI)

In some embodiments, the UI provides easy-to-use functionality in conjunction with a multiple-view visualization interface to offer simultaneous real-time inspection of data and interventions from different perspectives. In an example, this is achieved by providing different sets of controls that correspond to the different use cases supported by the components of the AIM model architecture. The UI enables multiple-view visualization and the capability for simultaneous inspection and intervention to multiple elements via a unified multiple-view layout management, thereby offering action-specific, context-sensitive interaction.

In some embodiments, these controls enable the parameterization, estimation and evaluation of several aspects of aviation-related analysis and include:

Map control (block 1*a* in FIG. 4)
Vertical profile control (block 1*b* in FIG. 4)
Design tools control (block 1*c* in FIG. 4)
Performance evaluation control (block 1*d* in FIG. 4)
Design rules validation control (block 1*e* in FIG. 4)

Map Control

In some embodiments, the map control is used to display two-dimensional information, including but not limited to:

FAA LEGACY data files that are parsed by the AIM as geospatial information with respective attribute tables:
Airports and other landing facilities (APT)
Fix/Reporting point/Waypoint (FIX)
Navigation Aids (NAV)
Preferred Route (PFR)/Tower Enroute Control (TEC) Routes
Regulatory Airways (AWY)
Coded Departure Route (CDR), which are preplanned, alternative routes between a specified city pair that can be quickly activated when traffic constraints exist, such as thunderstorms, turbulence or periods of excessive demand.
Air Traffic Survey (ATS) Non-Regulatory Airways
ARTCC Boundary Descriptions (ARB), wherein ARTCC is the Air Route Traffic Control Center that is a facility responsible for controlling aircraft flying in a particular volume of airspace at high altitudes between airport approaches and departures.
Holding Patterns (HPF)
ARTCC Facilities (AFF)
Automated Surface Observing System (ASOS), which is configured to report barometric pressure, wind speed and direction, DA, visibility, sky condition, ceiling height, and precipitation/Automated Weather Observing System (AWOS) that supports similar functionalities and are typically operated by the FAA or other local agencies.
Air Traffic Control Tower and Satellite Airport Communications
Country Codes
Enroute National Fix Program Significant Points (NAT-FIX)
Flight Service Station Communications Facilities (COM)
Flight Service Stations (FSS)
High Altitude Redesign (HAR) Significant Points (HARFIX)
Instrument Landing Systems (ILS/MLS) (ILS)
Location Identifiers (LID)
Miscellaneous Activity Area (MAA)
Military Training Routes (MTR)
Parachute Jump Area (PJA)
Standard Terminal Arrival/Standard Instrument Departure (Complete Set) (STARDP) or (AFSS Subset) (SSD)
State Codes
Weather Reporting Locations (WXL)
Special Use Airspaces (SUA)
FAA Digital Obstacle Files (DOF) (Obstacles data)
FAA's aeronautical data in ESRI Shapefile (.shp) format
ARINC 424 data
Census Population data
Terminal Procedure chart plates from the FAA's database
Complete airport modeling data including aerodrome geographic information, runway network (locations, dimensions, orientation), taxiway network, aprons, gates, park stands, and de-icing locations or facilities In some embodiments, the user may access additional information on the above by selecting specific elements. This information is retrieved from the relevant module, e.g., the core parametric model, the design module, or the performance evaluation module, and is in turn displayed within the map control in a separate property window.

In some embodiments, the user may also perform several actions and request specific tasks, such as design new elements, e.g., procedures via the map control.

Vertical Profile Control

In some embodiments, the vertical profile control allows for the inspection and intervention of selected elements from the map control, in mileage and vertical dimensions. The vertical profile control further enables the analysis of cross-sections along the mileage of a longitudinal element, e.g., a procedure. When a specific element is selected in the map control, its mileage and elevation are displayed in the vertical profile control, along with perpendicular projections of all neighboring objects to the centerline of the element. These projections can be calculated at a "buffer zone" on each side of the centerline, which can be varied by the user.

In some embodiments, additional information with regards to other functions, such as performance evaluation results may also be displayed in the vertical profile control as spatial elements. All pertinent calculations are performed in the relevant modules, e.g., the core parametric model, the design module, the performance evaluation module and their results are displayed in the vertical profile control. The user may also use the vertical profile control to affect specific elements, e.g., adjust procedure design gradients, etc.

Design Tools Control

In some embodiments, the design tools control includes controls related to tasks performed by the design module. These may include tasks related to airport design (runway, taxiway, gate planning, etc.), airspace design (procedure design, design rules and criteria selection, airspace sectorization, etc.) and generic geometric design. Each design tool control requests input from the user and provides guidance for completing each design task.

Performance Evaluation Controls

In some embodiments, the performance evaluation controls allows the user to inspect current performance of design elements or conduct more complex performance evaluation analysis related to specific design elements or to a set of design elements (e.g., an entire airspace and airport model). These controls may display performance evaluation results in terms of fuel burn, distance travelled, flight time, delays, among others and these can be calculated for different parameters, e.g., types of aircraft, wind conditions, etc. All calculations related to the performance evaluation controls tasks are performed in the performance evaluation module.

Design Rules Validation Control

In some embodiments, the design rules validation control displays the results of the design module related to conformance of design to specific sets of design rules and criteria implemented in the design rule library in the design module. All design rule and criteria evaluations are performed by the design module. The design rules validation control displays the results of the design rule and criteria evaluations at each current state of the system, whether they pass or fail, possible recommendations, along with citations to the relevant documentation (e.g., design manual paragraph and number). The user may inspect the status of design rule and criteria evaluations in the design rules validation control and may also activate or deactivate specific rules or criteria. In an example, this may be useful for procedure design that is "outside criteria."

In some embodiments, the combination of one or more of the controls in the UI enables the user to attain a holistic understanding of the status of an airspace and airport system, identify potential interdependencies between components, create design alternatives and evaluate their performance.

Other aspects, components, and operations of the AIM are further detailed in U.S. Pat. No. 11,189,177, which is hereby incorporated by reference herein in its entirety.

3 Embodiments and Implementations of the Disclosed Technology

Figure 6A:
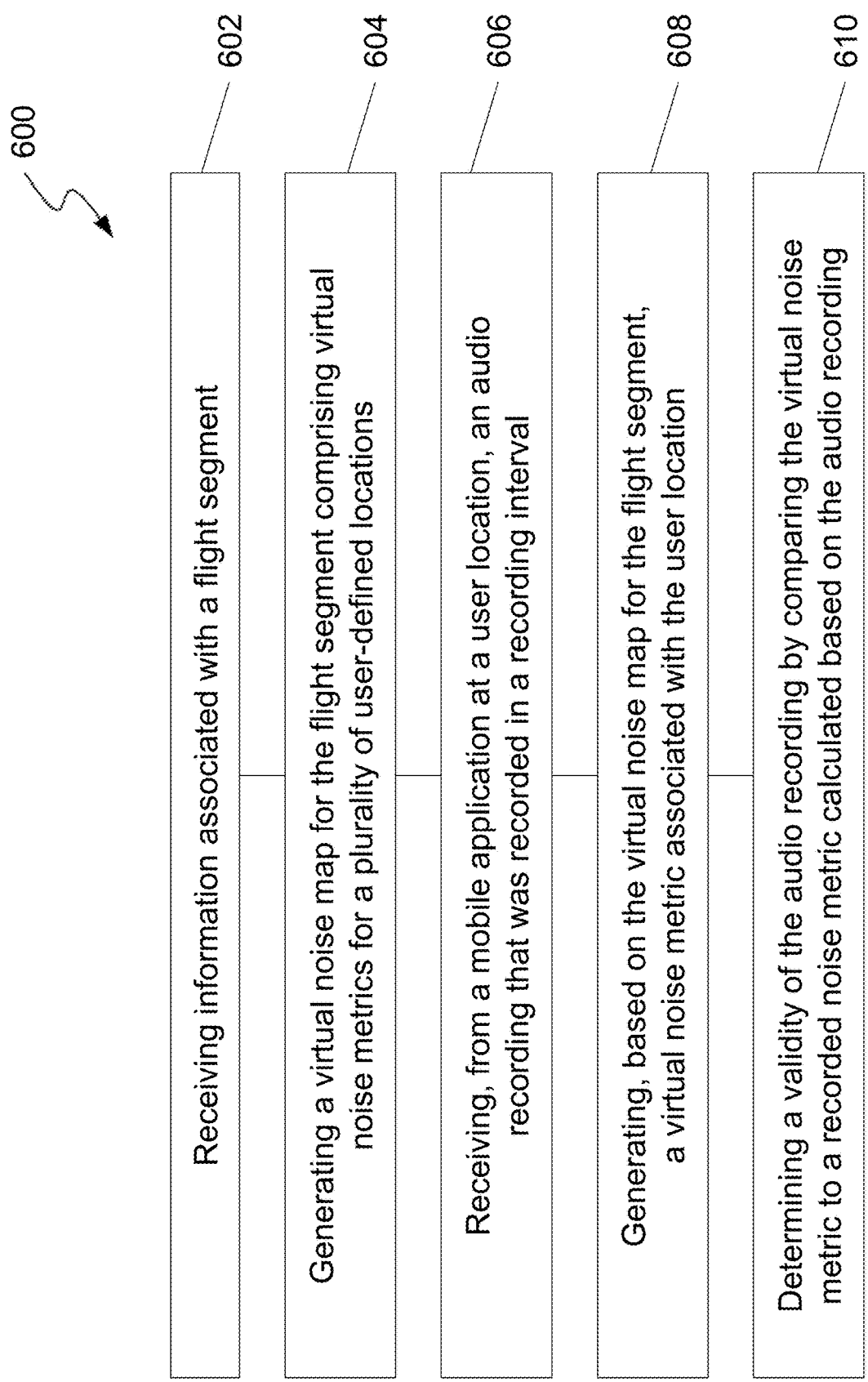
FIG. 6A-6C illustrate flowcharts of example methods of improving sound and noise management for an airport, according to embodiments of the disclosed technology.

FIG. 6A shows an example method 600 of improving airport sound and noise management. Embodiments corresponding to method 600 provide a hybrid virtual noise monitoring system that includes generating a virtual noise map comprising virtual noise metrics (as described in Section 1.2) generated at each of multiple user-defined locations (e.g., specific locations like churches, schools, community centers, etc.), or alternatively, each grid point of a user-defined grid. A user with the mobile application (as described in Section 1.3) captures an audio recording, at a user location, of an aircraft on a flight segment. The method 600 generates a virtual noise metric at that user location to then validate the audio recording.

The method 600 includes, at operation 602, receiving information associated with a flight segment. In some embodiments, a flight segment is characterized by a starting location and an ending location (both in three-dimensional space, and referred to as waypoints) and a starting time and an ending time. In an example, a flight segment associated with an aircraft taking off from a runway in an airport system (e.g., a metroplex) would have a starting location on the run with an altitude of zero and an ending location at a point outside the airspace of the metroplex at, for example, 10,000 ft. The takeoff time would be the starting time and the ending time would be the amount of time it took for the aircraft to get to the ending location added to the starting time. In another example, a flight segment may be between two waypoints at cruising altitude, e.g., 35,000 ft. The term flight path is used to indicate the trajectory of the aircraft between the starting waypoint and the ending waypoint.

In some embodiments, and in the context of Section 1.1, the information associated with the flight segment is received from a flight track feed. In an example, the information associated with the flight segment is received from an ADS-B receiver, a System Wide Information Management (SWIM) system operated by the Federal Aviation Administration (FAA), and similar systems.

The method 600 includes, at operation 604, generating a virtual noise map for the flight segment comprising virtual noise metrics for a plurality of user-defined locations. Herein, each of the user-defined locations may correspond to specific locations (e.g., churches, schools, etc.) or grid points on a user-defined grid (e.g., a uniformly spaced grid or a randomly generated grid). Herein, the user-defined locations span a projection of the flight path on a surface of the Earth. In an example, the virtual noise metrics are generated using a maximum A-weighted sound level, a sound exposure level, or an effective perceived noise level, e.g., described in Section 1.2.

The method 600 includes, at operation 606, receiving, from a mobile application at a user location, an audio recording recorded in a recording interval. In some embodiments, the user location is within a predetermined distance of the projection of the flight path, and the starting time of the flight segment precedes a start time of the recording interval. This corresponds to the user with the mobile application hearing the sound of an oncoming flight and turning on the mobile application to capture the audio recording. In an example, the user location and the start and end times of the recording interval are embedded into the metadata of the audio recording. In another example, the method 600 includes receiving, from the mobile application, the location, the start time of the recording interval, and the end time of the recording interval. The mobile application, and generating and using the audio recording are discussed in Section 1.3.

The method 600 includes, at operation 608, generating, based on the virtual noise map for the flight segment, a virtual noise metric associated with the user location. In an example, the virtual noise metric associated with the user location is an exposure-based noise level metric. In another example, the virtual noise metric is one of the noise metrics shown in FIG. 3.

The method 600 includes, at operation 610, determining a validity of the audio recording by comparing the virtual noise metric to a recorded noise metric that is calculated based on the audio recording. The validity of the audio recording, generated by comparing the virtual noise metric to the recorded noise metric, can be used to determine whether the sound and noise experienced by a user (at the user location) is due to the aircraft on its flight path, or due to an unrelated reason, e.g., a construction zone adjacent to the user location. In an example, the validity of the audio recording is determined based on third-party information that is obtained in real-time, e.g., a transportation feed from the city or county.

In some embodiments, the method 600 includes the operation of generating, for display on a user interface and based on the virtual noise map, at least one noise visualization, wherein the at least one noise visualization comprises a noise contour map for the airport, a noise monitor grid for the airport, a noise exposure over time plot for the airport, or a data table associated with the airport. In an example, when the audio recording is a noise sample, the audio recording may be received in conjunction with a user complaint. Then, based on the validity of the audio recording, the method 600 includes selecting a portion of the at least one noise visualization and transmitting, to the user, the portion of the at least one noise visualization. This enables users in the community who are being affected by the increased airport noise, and that are contributing to the noise mitigation effort, to receive feedback related to their efforts. Section 1.4 discusses the visualization interface.

In some embodiments, and having generated the at least one noise visualization, the method 600 includes the operations of generating, based on the comparing, a difference value between the virtual noise metric and the recorded noise metric, and providing for display, on the user interface, (a) a first indication when the difference value is less than a threshold or (b) a second indication when the difference is greater than the threshold, wherein the at least one noise visualization is further based on the first indication or the second indication. In an example, the threshold is selected to provide a visual indication of the validity of the audio recording.

Figure 6B:
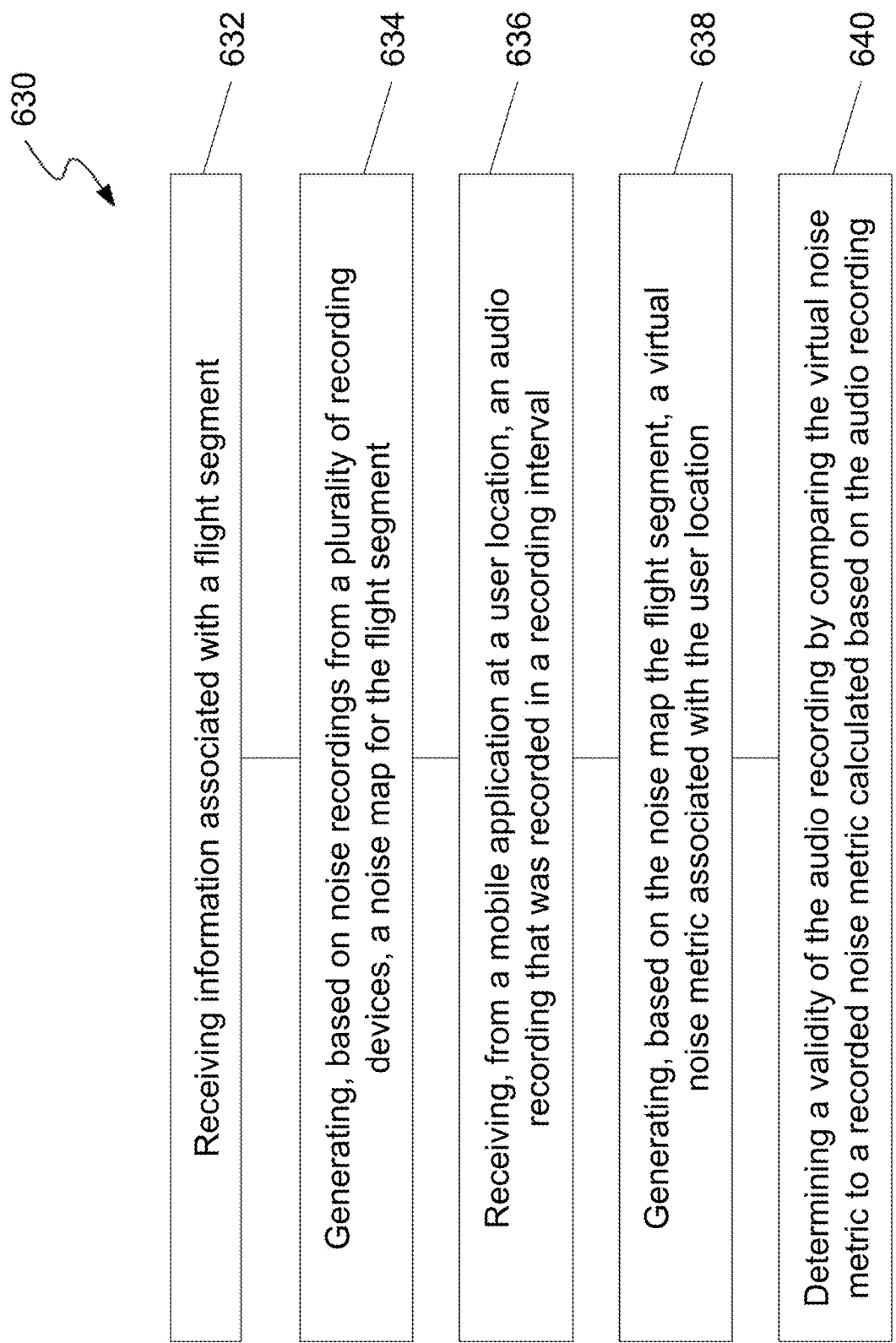

FIG. 6B shows another example method 630 of improving airport sound and noise management. This example includes some features, operations, and/or aspects that are similar to those shown in FIG. 6A. At least some of these features, operations, and/or aspects may not be separately described in this section. Embodiments corresponding to method 630 provide a noise monitoring system that includes generating a noise map comprising noise samples captured using multiple recording devices, each of which is located at a corresponding location in an aircraft flight path. A user with the mobile application (as described in Section 1.3) captures an audio recording, at a user location, of an aircraft on a flight segment. The method 630 generates a virtual noise metric at that user location to then validate the audio recording. Alternatively, if the user location corresponds to one of the multiple recording locations, then the two noise samples can be directly compared to validate the audio recording.

The method 630 includes, at operation 632, receiving information associated with a flight segment.

The method 630 includes, at operation 634, generating, based on noise recordings from a plurality of recording devices, a noise map for the flight segment. Herein, and different from method 600 that generates a virtual noise map comprising virtual noise metrics, method 630 uses actual noise samples captured at a plurality of recording locations using the plurality of recording devices to generate a noise map that includes noise metrics generated from the corresponding actual noise samples. In an example, the recording devices include smartphones that support the mobile application (described in Section 1.3), acoustic sensors, and/or acoustic receivers. The recording devices are located at the plurality of recording locations that spans a projection of the flight path on a surface of the Earth.

The method 630 includes, at operation 636, receiving, from a mobile application at a user location, an audio recording that was recorded in a recording interval.

The method 630 includes, at operation 638, generating, based on the noise map the flight segment, a virtual noise metric associated with the user location.

The method 630 includes, at operation 640, determining a validity of the audio recording by comparing the virtual noise metric to a recorded noise metric calculated based on the audio recording.

Figure 6C:
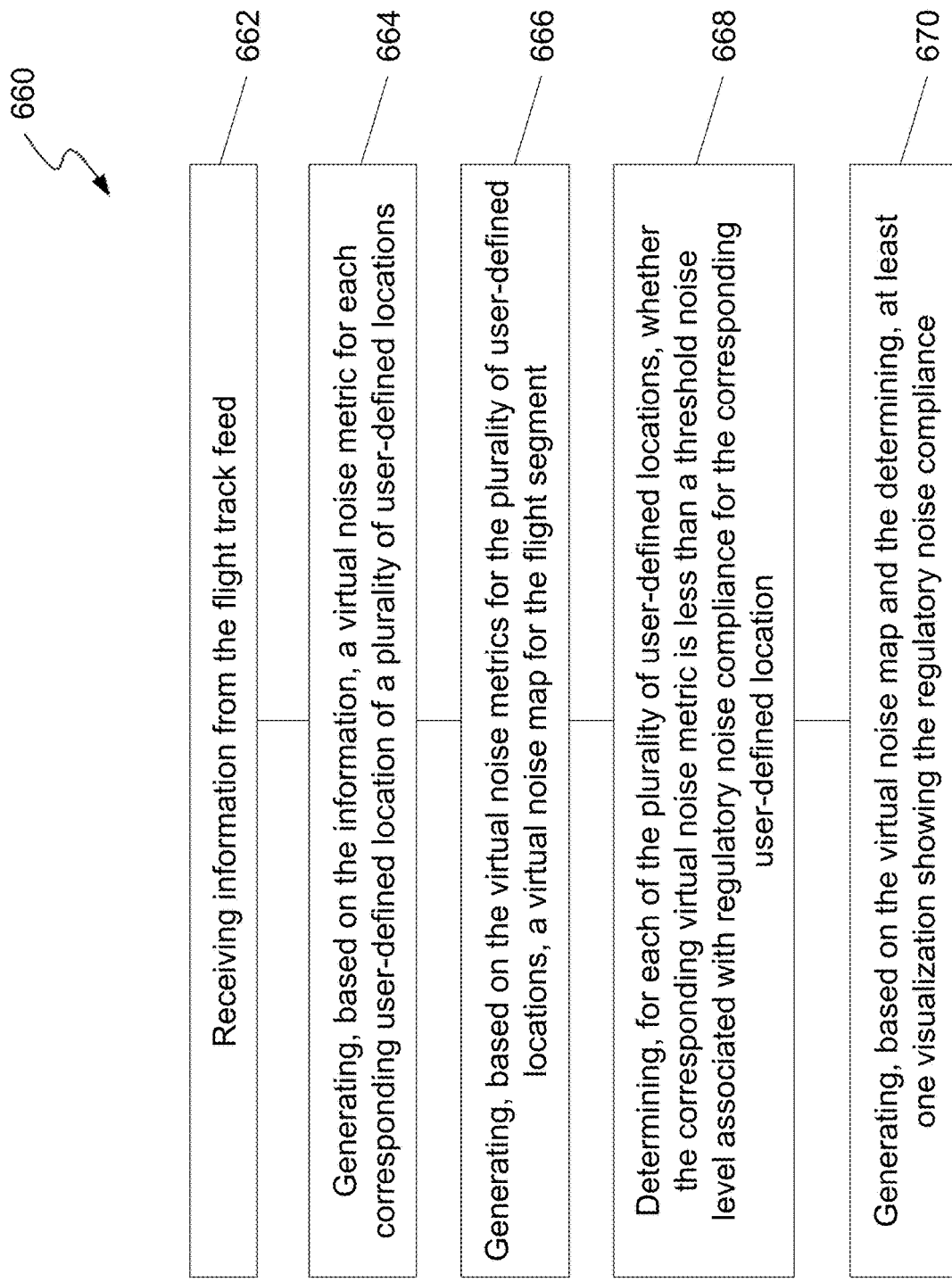

FIG. 6C shows yet another example method 660 of improving airport sound and noise management. This example includes some features, operations, and/or aspects that are similar to those shown in FIGS. 6A and 6B. At least some of these features, operations, and/or aspects may not be separately described in this section. Embodiments corresponding to method 660 provide a virtual noise monitoring system that uses flight information to generate a virtual noise map that can be used to determine whether airport operations are complying with regulatory sound and noise requirements of the areas in the flight path of an aircraft.

The method 660 includes, at operation 662, receiving information from the flight track feed. In some embodiments, the flight track feed is communicatively coupled to a System Wide Information Management (SWIM) system operated by the Federal Aviation Administration, an Automatic Dependent Surveillance-Broadcast (ADS-B) receiver, or another flight data source.

The method 660 includes, at operation 664, generating, based on the information, a virtual noise metric for each corresponding user-defined location of a plurality of user-defined locations, and at operation 666, generating, based on the virtual noise metrics for the plurality of user-defined locations, a virtual noise map for the flight segment. In an example, the virtual noise metrics are generated as described in Section 1.2.

The method 660 includes, at operation 668, determining, for each of the plurality of user-defined locations, whether the corresponding virtual noise metric is less than a threshold noise level associated with regulatory noise compliance for the corresponding user-defined location.

The method 660 includes, at operation 670, generating, based on the virtual noise map and the determining, at least one visualization showing the regulatory noise compliance. In an example, the regulatory noise compliance for the airport is determined by the city. In another example that focuses on an airport system (or metroplex) the regulatory compliance for sound and noise is determined in conjunction with multiple local agencies.

In some embodiments, the method 660 includes the operations of using a noise recording mobile application to record a noise snippet at a user location, the noise snippet being recorded in a recording interval, and then receiving the noise snippet, identifying at least one of the plurality of user-defined locations that is within the predetermined distance from the user location, generating, based on the at least one of the plurality of user-defined locations, a virtual noise metric corresponding to the user location, and generating, based on the noise snippet and the virtual noise metric corresponding to the user location, a noise delta.

In some embodiments, the noise snippet may be associated with a user complaint, and upon generation of the noise delta, the method 660 includes the operations of selecting, based on the user complaint and the user location, a second portion of the at least one noise visualization that includes the noise delta, and transmitting, to the user, the second portion of the at least one noise visualization.

In some embodiments, and upon generation of the noise delta, the method 660 includes using an air traffic control system to change the starting location of the flight segment or the ending location of the flight segment in response to the virtual noise metric for at least one of the plurality of user-defined locations being greater than the threshold noise level. This ensures that airport operations are complying with any regulatory sound and noise requirements.

Figure 7:
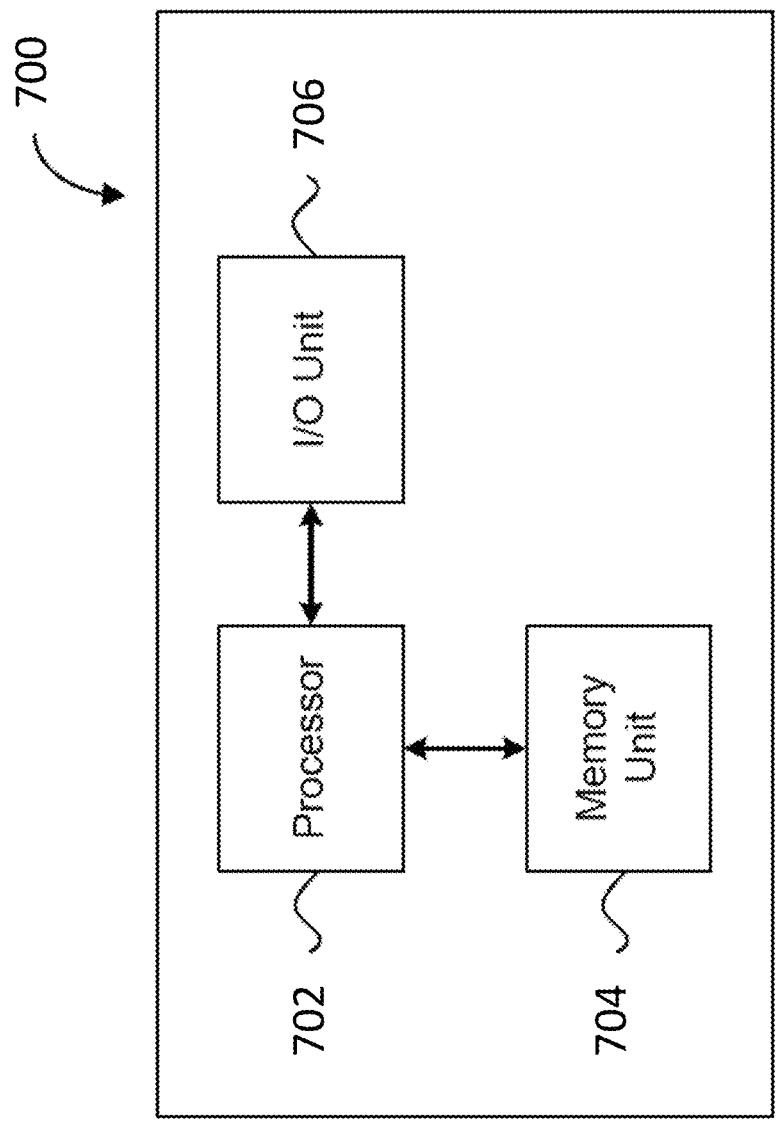
FIG. 7 illustrates a block diagram of an example device that can be configured to implement the disclosed technology.

FIG. 7 shows a block diagram of an example embodiment of a device (or apparatus, hardware device or implementation) 700 that implements the disclosed technology including methods 600, 630 and 660. The device includes a processor 702 in communication with a memory unit 704 and an input/output (I/O) unit 706. The processor 702 is configured to process data, and the memory unit 704 is in communication with the processor 702 to store and/or buffer the data. To support various functions of the device, the processor 702 can be included to interface with and control operations of other devices, e.g., via the I/O unit 706.

In some embodiments, and in the context of FIG. 1, the processor 702 can be configured to implement all or a portion of the hybrid virtual noise monitoring system 120, and receive inputs from the flight track feed 110 and the data feed from the noise recording mobile application 130, and the I/O unit 706 may include the visualization interface 140.

In various implementations, the processor 702 can include one or more processors, e.g., including but not limited to microprocessors such as a central processing unit (CPU), microcontrollers, or the like. The memory unit 704 can include and store processor-executable code, which when executed by the processor, configures the device to perform various operations, e.g., such as receiving information, commands, and/or data, processing information and data, and transmitting or providing information/data to another device. The memory unit can store other information and data, such as instructions, software, values, images, and other data processed or referenced by processor. For example, various types of Random Access Memory (RAM) devices, Read Only Memory (ROM) devices, Flash Memory devices, and other suitable storage media can be used to implement storage functions of memory unit. In some implementations, the device includes I/O unit 706 to interface the processor and/or memory unit to other modules, units or devices associated with the system, and/or external devices. For example, the I/O unit can connect to an external interface, source of data storage, or display device. Various types of wired or wireless interfaces compatible with typical data communication standards, such as Universal Serial Bus (USB), IEEE 1394 (FireWire), Bluetooth, Bluetooth low energy (BLE), ZigBee, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE cellular communication methods, and parallel interfaces, can be used to communicate data with the device via the I/O unit. In some implementations, for example, the device includes a wireless communications unit, e.g., such as a transmitter (Tx) or a transmitter/receiver (Tx/Rx) unit. In such implementations, for example, the I/O unit can interface the processor and memory unit with the wireless communications unit to utilize various types of wireless interfaces, such as the examples described above. The I/O unit can interface with other external interfaces, sources of data storage, and/or visual or audio display devices, etc. to retrieve and transfer data and information that can be processed by the processor, stored in the memory unit, or exhibited on an output unit of a user device (e.g., display screen of a computing device) or an external device.

It is understood that the various disclosed embodiments may be implemented individually, or collectively, in devices comprised of electronic components, hardware and/or software modules and components. These devices, for example, may comprise a processor, a memory unit, an interface that are communicatively connected to each other, and may range from desktop and/or laptop computers, to mobile devices and the like. The processor and/or controller can be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of improving sound and noise management for an airport, comprising:
   receiving information associated with a flight segment, the information comprising (a) a flight path between a starting location of the flight segment and an ending location of the flight segment and (b) a starting time of the flight segment and an ending time of the flight segment;
   generating a virtual noise map for the flight segment, wherein the virtual noise map comprises a virtual noise metric generated for each corresponding user-defined location of a plurality of user-defined locations that spans a projection of the flight path on a surface of the Earth;
   receiving, from a mobile application at a user location, an audio recording that was recorded in a recording interval, wherein the user location is within a predetermined distance of the projection of the flight path, and wherein the starting time of the flight segment precedes a start time of the recording interval;
   generating, based on the virtual noise map for the flight segment, a virtual noise metric associated with the user location; and
   determining a validity of the audio recording by comparing the virtual noise metric associated with the user location to a recorded noise metric that is calculated based on the audio recording.

2. The method of claim 1, comprising:
   receiving, from the mobile application, the location, a start time of the recording interval, and an end time of the recording interval.

3. The method of claim 1, comprising:
   receiving a flight track feed comprising the information associated with the flight segment, wherein the flight track feed is communicatively coupled to an Automatic Dependent Surveillance-Broadcast (ADS-B) receiver or another flight data source.

4. The method of claim 1, comprising:
   generating the virtual noise metric at the corresponding user-defined location using a maximum A-weighted sound level, a sound exposure level, or an effective perceived noise level.

5. The method of claim 1, comprising:
   generating, for display on a user interface and based on the virtual noise map, at least one noise visualization, wherein the at least one noise visualization comprises a noise contour map for the airport, a noise monitor grid for the airport, a noise exposure over time plot for the airport, or a data table associated with the airport.

6. The method of claim 5, comprising:
   generating, based on the comparing, a difference value between the virtual noise metric associated with the user location and the recorded noise metric; and
   providing for display, on the user interface, (a) a first indication when the difference value is less than a threshold or (b) a second indication when the difference is greater than the threshold, wherein the at least one noise visualization is further based on the first indication or the second indication.

7. The method of claim 5, wherein the audio recording is received with a user complaint.

8. The method of claim 7, comprising:
   selecting, based on the validity of the audio recording, a portion of the at least one noise visualization; and
   transmitting, to the user, the portion of the at least one noise visualization.

9. A system for improving sound and noise management for an airport, comprising:
   a processor; and
   a memory coupled to the processor,
   wherein the memory includes instructions, when executed by the processor, cause the processor to:
     receive information associated with a flight segment, the information comprising (a) a flight path between a starting location of the flight segment and an ending location of the flight segment and (b) a starting time of the flight segment and an ending time of the flight segment;
     generate, based on noise recordings from a plurality of recording devices, a noise map for the flight segment, wherein each of the plurality of recording devices is located at a corresponding recording location of a plurality of recording locations that spans a projection of the flight path on a surface of the Earth;
     receive, from a mobile application at a user location, an audio recording that was recorded in a recording interval, wherein the user location is within a predetermined distance of the projection of the flight path, and wherein the starting time of the flight segment precedes a start time of the recording interval;
     generate, based on the noise map the flight segment, a virtual noise metric associated with the user location; and
     determine a validity of the audio recording by comparing the virtual noise metric to a recorded noise metric that is calculated based on the audio recording.

10. The system of claim 9, wherein the plurality of recording devices comprises at least one of a smartphone comprising the mobile application, an acoustic sensor, or an acoustic receiver.

11. The system of claim 9, wherein the instructions, when executed by the processor, cause the processor to:
receive, from the mobile application, the location, a start time of the recording interval, and an end time of the recording interval.

12. The system of claim 9, wherein the instructions, when executed by the processor, cause the processor to:
receive a flight track feed comprising the information associated with the flight segment.

13. The system of claim 9, wherein the instructions, when executed by the processor, cause the processor to:
generate, for display on a user interface and based on the noise map, at least one noise visualization.

14. The system of claim 13, wherein the at least one noise visualization comprises a noise contour map for the airport, a noise monitor grid for the airport, a noise exposure over time plot for the airport, or a data table associated with the airport.

15. The system of claim 13, wherein the instructions, when executed by the processor, cause the processor to:
generate, based on the comparing, a difference value between the noise metric and the recorded noise metric; and
provide for display, on the user interface, (a) a first indication when the difference value is less than a threshold or (b) a second indication when the difference is greater than the threshold, wherein the at least one noise visualization is further based on the first indication or the second indication.

16. A system for improving sound and noise management for an airport, comprising:
a flight track feed to provide information associated with a flight segment, the information comprising a flight path between a starting location of the flight segment and an ending location of the flight segment;
a hybrid virtual noise monitoring system to
receive the information from the flight track feed,
generate, based on the information, a virtual noise metric for each corresponding user-defined location of a plurality of user-defined locations, wherein the plurality of user-defined locations is associated with the hybrid virtual noise monitoring system and spans a projection of the flight path on a surface of the Earth,
generate, based on the virtual noise metrics for the plurality of user-defined locations, a virtual noise map for the flight segment,
determine, for each of the plurality of user-defined locations, whether the corresponding virtual noise metric is less than a threshold noise level associated with regulatory noise compliance for the corresponding user-defined location, and
generate, based on the virtual noise map and the determining, at least one visualization showing the regulatory noise compliance; and
a visualization interface to receive the at least one noise visualization and provide for display at least a first portion of the at least one noise visualization.

17. The system of claim 16, wherein the at least one noise visualization comprises a noise contour map for the airport, a noise monitor grid for the airport, a noise exposure over time plot for the airport, a noise exposure difference over time plot, or a data table associated with the airport.

18. The system of claim 16, wherein the virtual noise map is generated using a maximum A-weighted sound level, a sound exposure level, or an effective perceived noise level.

19. The system of claim 16, wherein the flight track feed is communicatively coupled to a System Wide Information Management (SWIM) system operated by the Federal Aviation Administration, an Automatic Dependent Surveillance-Broadcast (ADS-B) receiver, or another flight data source.

20. The system of claim 16, comprising:
a noise recording mobile application to record a noise snippet at a user location, wherein the noise snippet was recorded in a recording interval,
wherein the hybrid virtual noise monitoring system is configured to:
receive the noise snippet,
identify at least one of the plurality of user-defined locations that is within a predetermined distance from the user location,
generate, based on the at least one of the plurality of user-defined locations, a virtual noise metric corresponding to the user location, and
generate, based on the noise snippet and the virtual noise metric corresponding to the user location, a noise delta.

21. The system of claim 20, wherein the noise snippet is associated with a user complaint, and wherein the hybrid virtual noise monitoring system is configured to:
select, based on the user complaint and the user location, a second portion of the at least one noise visualization that includes the noise delta; and
transmit, to the user, the second portion of the at least one noise visualization.

22. The system of claim 20, comprising:
an air traffic control system to change the starting location of the flight segment or the ending location of the flight segment in response to the virtual noise metric for at least one of the plurality of user-defined locations being greater than the threshold noise level.

* * * * *